Sept. 24, 1957   R. SCHNEIDER   2,807,321
FEEDING MEANS FOR EVAPORATORS
Filed Oct. 6, 1953

INVENTOR.
RUDOLF SCHNEIDER
BY Burgess + Dinklage
ATTORNEYS

United States Patent Office 2,807,321
Patented Sept. 24, 1957

2,807,321

FEEDING MEANS FOR EVAPORATORS

Rudolf Schneider, Krefeld-Uerdingen, Germany, assignor to Farbenfabriken Bayer Aktiengesellschaft, Leverkusen, Germany, a corporation of Germany Application October 6, 1953, Serial No. 384,454

Claims priority, application Germany November 4, 1952

2 Claims. (Cl. 159—13)

This invention relates to feeding means for evaporators of the kind in which liquid is continuously introduced and evaporated (preferably in vacuo) by distributing and passing the liquid as a thin film over a heated surface by stirring means arranged inside the evaporator.

It is known to provide evaporators of this kind with feeding means which comprise, for instance, rings or like devices arranged inside an evaporating chamber, but such feeding means have the disadvantage that vapours, and eventually dissolved gases escaping from the introduced liquid material due to a drop of pressure and the sudden contact with the hot wall, will carry with them part of the liquid in the form of droplets which are partly passed into the escaping vaporous stream and partly impair the concentration of the effluent.

According to the present invention this disadvantage is eliminated by using a rotary separator as the feeding means. The separator preferably comprises one or more profile rings which form ring slots with the wall of the evaporator. These ring slots are so narrow that they allow the passage of a thin liquid stream only. The side of the separator facing the wall of the evaporator has one or more reversing ribs by which the vapour is liberated from the liquid droplets carried along. The separator is provided with outlets through which the liquid can issue.

Figure 1:
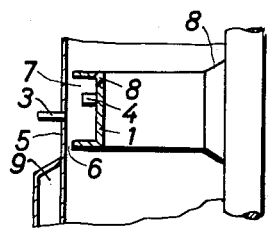
Figure 2:
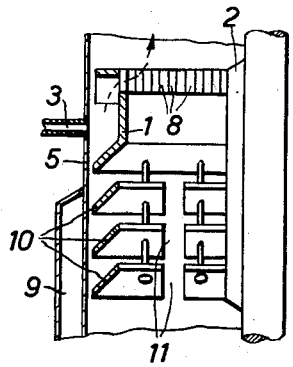
Figure 3:
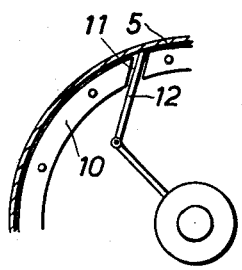

In the accompanying diagrammatic drawing, which illustrates some embodiments of the invention by way of example, Figure 1 is a fragmentary sectional elevation of a feeding means constructed according to the invention, and Figures 2 and 3 are respectively a fragmentary sectional elevation and a plan view of an alternative construction.

Referring to Figure 1, a separator for feeding an evaporator comprises a profile ring 1 having an annular distributor groove and arranged on a rotary shaft 2. The groove forms a chamber into which is directed a feed pipe 3 for the material under treatment. Arranged in the groove is a reversing ring or rib 4 by means of which the liquid introduced is passed to the inside wall of the evaporator 5 down which the liquid then flows, as a thin film, through a slot 6 between the ring 1 and the wall of the evaporator. The evaporator 5 is surrounded by a heating jacket 9. The vapour produced in the expansion of the liquid material is reversed by the edge of the ring 4, and is thereby liberated from liquid droplets carried along with it, and is passed from an upper chamber 7 of the groove through openings 8 into the inside of the evaporator from which it is conveyed to a condenser (not shown in the drawing) with the main quantity of vapour produced in the evaporator.

The separator shown in Figures 2 and 3 has additional profile rings 10 which effect complete separation of the vapour from the liquid in the after-evaporation. The rings 10 have recesses 11 for brushes 12.

The separator provided by the invention allows of evaporating products in one passage in a vacuum of 1/10 Torr and less and results in an increase of the efficiency of the evaporator insofar as a liquid product can be heated up to substantially near its boiling temperature under vacuum conditions—provided that its thermal sensitivity does not prohibit such procedure—prior to its introduction into the evaporator without any danger of being carried along by the vapor produced in the distributor groove.

Strongly foaming substances, for instance glues, can be evaporated in the evaporator without difficulty.

I claim:

1. In a film evaporator having a heated evaporating surface and means for passing liquid thereover in the form of a thin film, the improvement in the means for feeding said liquid to be evaporated to the evaporator, and the separation of vapor therefrom, which comprises at least a portion of said evaporating surface defined by a housing of substantially circular cross-section, a distributor wheel defining a substantially centrally positioned, outwardly facing, annular groove in the form of a surface of revolution, rotatably positioned concentrically within said housing and spaced from the inner surface thereof, a reversing ring positioned in said groove extending in the direction toward said housing wall, said distributor wheel and reversing ring defining with the adjacent inner surface of said housing an upper annular vapor passage and a lower annular liquid passage, and means for passing liquid to be evaporated into said annular groove below said reversing ring, and means for rotating said distributor wheel.

2. Improvement, according to claim 1, in which said distributor wheel defines vapor passages through its surface in the upper annular vapor passage.

References Cited in the file of this patent

UNITED STATES PATENTS

| 1,284,074 | Du Pont | Nov. 5, 1918 |
| 1,365,055 | Merrell | Jan. 11, 1921 |
| 2,040,837 | Yarmett | May 19, 1936 |
| 2,546,381 | Zahm | Mar. 27, 1951 |
| 2,562,153 | Taylor | July 24, 1951 |
| 2,606,146 | Luten | Aug. 5, 1952 |

FOREIGN PATENTS

| 3,379 | Great Britain | Aug. 4, 1881 |
| 242,883 | Great Britain | Nov. 19, 1925 |